United States Patent
Sharma

(10) Patent No.: US 11,487,639 B2
(45) Date of Patent: Nov. 1, 2022

(54) USER EXPERIENCE SCORING AND USER INTERFACE

(71) Applicant: VMware, inc., Palo Alto, CA (US)

(72) Inventor: Amit Sharma, Atlanta, GA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 17/154,151

(22) Filed: Jan. 21, 2021

(65) Prior Publication Data

US 2022/0229756 A1    Jul. 21, 2022

(51) Int. Cl.
| | | |
|---|---|---|
| *G06F 11/34* | (2006.01) | |
| *G06F 9/54* | (2006.01) | |
| *G06F 9/451* | (2018.01) | |

(52) U.S. Cl.
CPC .......... *G06F 11/3409* (2013.01); *G06F 9/451* (2018.02); *G06F 9/541* (2013.01)

(58) Field of Classification Search
None
See application file for complete search history.

(56) References Cited

U.S. PATENT DOCUMENTS

| | | | |
|---|---|---|---|
| 8,321,526 B2 | 11/2012 | Raleigh | |
| 8,917,854 B2 | 12/2014 | Castellani | |
| 9,374,369 B2 | 6/2016 | Mahaffey | |
| 9,799,043 B2 | 10/2017 | Jain | |
| 9,967,351 B2 | 5/2018 | Maheshwari | |
| 10,824,536 B1 | 11/2020 | Vyas | |
| 11,055,417 B2 | 7/2021 | Bhatia | |
| 11,144,038 B2 | 10/2021 | Stump | |
| 11,165,800 B2 | 11/2021 | Thampy | |

(Continued)

FOREIGN PATENT DOCUMENTS

| | | |
|---|---|---|
| AU | 2014363926 | 8/2015 |
| CN | 111314491 A | 6/2020 |
| WO | WO2015199609 | 12/2015 |

OTHER PUBLICATIONS

"Color transition in slider bar, Oct. 2018", Qualtrics XM community forum, (https://community.quaitrics.com/XMcommunity/discussion/2269/color-transition-in-slider-bar) (Year: 2008).

(Continued)

*Primary Examiner* — Chat C Do
*Assistant Examiner* — William C Wood
(74) *Attorney, Agent, or Firm* — Clayton, McKay & Bailey, PC

(57) ABSTRACT

Systems and methods are described for providing and configuring an overall user experience score. Mobile and desktop user devices can collect and send data to a server about an application installed on the devices and the health of the devices. The server can use the application data and device health information to determine three scores for the application: a mobile score for a mobile version, a desktop score for a desktop version, and a device health score. The server can determine an overall user experience score based on the lowest of the three scores. The server can cause the overall user experience score to be displayed in a first graphical user interface ("GUI"). A second GUI can allow an administrator to reconfigure scoring metrics for the user experience scores by moving elements on a sliding bar that changes thresholds.

20 Claims, 8 Drawing Sheets

(56) References Cited

U.S. PATENT DOCUMENTS

| | | |
|---|---|---|
| 2002/0198984 A1 | 12/2002 | Goldstein |
| 2003/0065986 A1 | 4/2003 | Fraenkel |
| 2004/0158132 A1 | 8/2004 | Zaleski |
| 2007/0079355 A1 | 4/2007 | Chand |
| 2009/0327151 A1 | 12/2009 | Carlson |
| 2012/0069131 A1 | 3/2012 | Abelow |
| 2013/0263242 A1 | 10/2013 | Jain |
| 2014/0033055 A1* | 1/2014 | Gardner .............. G06F 11/3409 715/736 |
| 2014/0059599 A1 | 2/2014 | Sirpal |
| 2014/0282252 A1 | 9/2014 | Edwards |
| 2015/0127819 A1* | 5/2015 | Cimino ................. H04L 43/16 709/224 |
| 2016/0028833 A1 | 1/2016 | Georgieva |
| 2016/0294606 A1 | 10/2016 | Puri |
| 2017/0337287 A1 | 11/2017 | Gill |
| 2018/0375886 A1 | 12/2018 | Kirti |
| 2019/0098037 A1 | 3/2019 | Shenoy, Jr. |
| 2019/0138964 A1* | 5/2019 | Morita ................ G06F 11/3006 |
| 2019/0306044 A1* | 10/2019 | Cohen .................... H04L 67/22 |
| 2020/0045519 A1 | 2/2020 | Raleigh |
| 2020/0128047 A1 | 4/2020 | Biswas |
| 2020/0234356 A1 | 7/2020 | Rembert |
| 2020/0366747 A1 | 11/2020 | Bordia |
| 2021/0034495 A1* | 2/2021 | Venkatraman ...... G06F 11/3024 |
| 2021/0286510 A1 | 9/2021 | Tyler |
| 2021/0318893 A1 | 10/2021 | Zhang |
| 2021/0409403 A1 | 12/2021 | Lewin |
| 2022/0078007 A1 | 3/2022 | Reddem |

OTHER PUBLICATIONS

VMware, Manage NSX Intelligence Alarm States, Mar. 23, 2020, https://docs.vmware.com/en/, 3 pages (Year: 2020).

Brijesh, Firebase Chashlytics, Nov. 29, 2017, https://web.archive.org/, 7 pages (Year: 2017).

* cited by examiner

USER EXPERIENCE SCORING AND USER INTERFACE

BACKGROUND

Businesses often look for ways to improve customers' experiences with their business or product. This typically requires gathering large amounts of data and using various metrics to determine how positive or negative a user experience was. Some software companies gather data on bugs and crashes to determine the user experience based on whether the software is performing as designed.

Current methods for determining the quality of a user experience with software applications exclude important factors that affect a user's experience. For example, some user experience metrics consider performance data like errors, hang times, and crashes, but ignore how the health of the user's device affects the user's experience and vice versa. Some metrics fail to consider a desktop and a mobile version of an application separately. All of these methods fail to consider that a low user experience on any metric can cause an overall negative user experience.

As a result, a need exists for determining a comprehensive user experience score for application users.

SUMMARY

Examples described herein include systems and methods for scoring a user experience with an application. A management server can receive first application data from a mobile version of an application executing on a mobile user device. The first application data can include user experience information for the mobile version of the application. The management server can determine a mobile user experience score based on the first application data. The mobile user experience score can be specific to the mobile user device, specific to a user associated with the mobile user device, or an aggregate score based on application data from multiple mobile user devices.

In an example, the management server can receive second application data from a desktop version of an application executing on a desktop user device. The second application data can include user experience information for the desktop version of the application. The management server can determine a desktop user experience score based on the second application data. The desktop user experience score can be specific to the desktop user device, specific to a user associated with the desktop user device, or an aggregate score based on application data from multiple desktop user devices.

In an example, the management server can receive device health information regarding the mobile and desktop user devices. The device health information can include an indication of at least one of battery health, operating system crashes, boot time, shutdown time, and available storage, among others. The management server can determine a device health user experience score based on the device health information. The device health user experience score can be specific to a user device, specific to all user devices associated with a user, or an aggregate score based on device health information from multiple user devices.

In an example, the management server can determine an overall user experience score based on the other user experience scores. In one example, the overall user experience score can be the lowest of the user experience scores. The management server can cause the overall user experience score to be displayed in a graphical user interface ("GUI").

Examples described herein also include a GUI for configuring a user experience score framework. The GUI can include expandable categories that correspond to the desktop user experience score, mobile user experience score, device health user experience score, and overall user experience score. When a user selects one of the expandable categories, the GUI can expand the selected category to display more information about the category's scoring metrics. For example, the GUI can display information about the metrics used to determine the score.

The GUI can include slide bars for the scoring metrics. The slide bars can be interactive GUI elements that allow an administrator ("admin") user to reconfigure the score metrics. For example, the data for each metric can be compared to thresholds for different scores, such as "poor," "neutral," and "good." The slide bar can include movable elements that can change the thresholds. For example, the slide bar can include a first movable element between "poor" and "neutral," and a second movable element between "neutral" and "good." An admin user can slide the movable elements to change the thresholds between scores. After a user reconfigures the thresholds, the management server can implement the changes on the scoring GUI.

The examples summarized above can each be incorporated into a non-transitory, computer-readable medium having instructions that, when executed by a hardware-based processor associated with a computing device, cause the processor to perform the stages described. Additionally, the example methods summarized above can each be implemented in a system including, for example, a memory storage and a computing device having a hardware-based processor that executes instructions to carry out the stages described.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Systems and methods are described for providing and configuring an overall user experience score. Mobile and desktop user devices can collect and send data to a server about an application installed on the devices and the health of the devices. The server can use the application data and device health information to determine three scores for the application: a mobile user experience score for a mobile version, a desktop user experience score for a desktop version, and a device health score. The server can determine an overall user experience score based on the lowest of the three scores. The server can cause the overall user experience score to be displayed in a first GUI. A second GUI can allow an administrator to reconfigure scoring metrics for the user experience scores by moving elements on a sliding bar that changes thresholds for different scores. The server can implement the changes into the experience score displayed in the first GUI.

Figure 1:
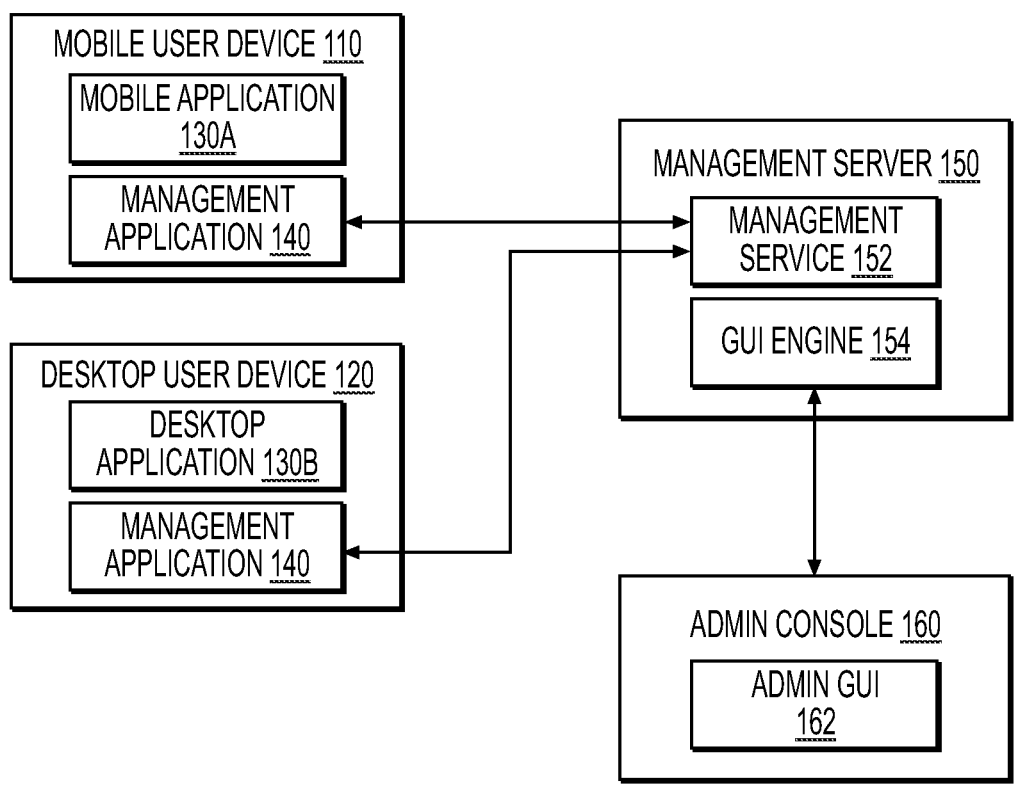
FIG. 1 is an illustration of an example system for scoring a user experience with an application.

FIG. 1 is an illustration of a system for scoring a user experience with an application. A management server 150 can communicate with a mobile user device 110 and a desktop user device 120. The management server 150 can be a single server or a group of servers, including multiple servers implemented virtually across multiple computing platforms. The mobile user device 110 can be one or more hardware-processor-based mobile devices, such as a tablet or cell phone. The mobile user device 110 can execute a mobile version of an operating system, such as ANDROID or iOS, and mobile versions of applications. The desktop user device 120 can be one or more hardware-processor-based desktop devices, such as a laptop or desktop computer. The desktop user device 120 can execute a desktop version of an operating system, such as WINDOWS or MAC OS, and desktop versions of applications.

The mobile user device 110 can include a mobile version of an application 130a, and the desktop user device 120 can include a desktop version of the same application 130b. In an example, the user devices 110, 120 can be managed by the management server 140 as part of a Unified Endpoint Management ("UEM") system. For example, the user devices 110, 120 can include a management application 140. The management application 140 can be a stand-alone application, part of an enterprise application, or part of an operating system of the user devices 110, 120.

The management application 140 can communicate with the management server 110, allowing UEM management of user devices 110, 120 based on compliance and security settings at the management server 150. A management service 152 on the management server 150 can be responsible for handling device management for the UEM. The management application 140 can enforce compliance at the user devices 110, 120, such as by wiping enterprise data when compliance standards are not met. Example compliance standards can include ensuring that a device is not jailbroken, that particular encryption standards are used in enterprise data transmission, that the device does not have certain blacklisted applications installed or running, and that the device is located within a geofenced area when accessing certain enterprise resources.

In an example, the applications 130a, 130b (collectively "the application 130") can be managed applications. A managed application can allow an enterprise to control access and functionality of the application. Additionally, a managed application can persist locally on the user device or can be accessed from within the management application 140, depending on the example. Even when an application is accessed remotely, portions of that application or data utilized by the application can exist locally on the user devices 110, 120. Local resources can be encrypted and decrypted for use by the management application 140, managed application 130, or some other process of the UEM system.

In an example, the management application 140 on the user devices 110, 120 can collect data on how the application 130 is performing on that user device. For example, the management application 140 can collect data on usage rates, crash rates, network error events, network latency, application response time, application loading time, user flow failures, and CPU and memory utilization. The management application 140 can also collect information on the health of the user device, such as battery health, operating system crashes, boot time, shutdown time, and available storage. The management application 140 can send this information to the management server 150. In an example, the management application 140 can send the application data and device health information as one or more a data files using an Application Program Interface ("API") call or an Internet protocol, such as hypertext transfer protocol ("HTTP"), simple object access protocol ("SOAP"), representational state transfer ("REST"), and/or other protocols.

In an example, the management server 150 can use the application data and device health information to determine user experience scores. For example, the management server 150 can determine a mobile user experience score, desktop user experience score, and a device health experience score. The management server 150 can also identify the lowest of the three scores as an overall user experience score. These scores can be determined for each user, application, group, or organization. The scores can then be presented in a scoring GUI. For example, the scores and their corresponding data can be provided to a GUI engine 154. The GUI engine 154 can generate a scoring GUI that displays the user experience score information.

In an example, an admin console 160 can allow an admin user to reconfigure the parameters for the user experience scores. The admin console 160 can be a device, application, or interface accessible by an admin user. The GUI engine 154 can provide an admin GUI to the admin console 160, which an admin user can use to reconfigure the user experience scoring. For example, the admin user can change parameters for how each experience score is determined and what metrics are used. The GUI engine 154 can receive the reconfiguration data and modify the scoring GUI accordingly.

Figure 2:
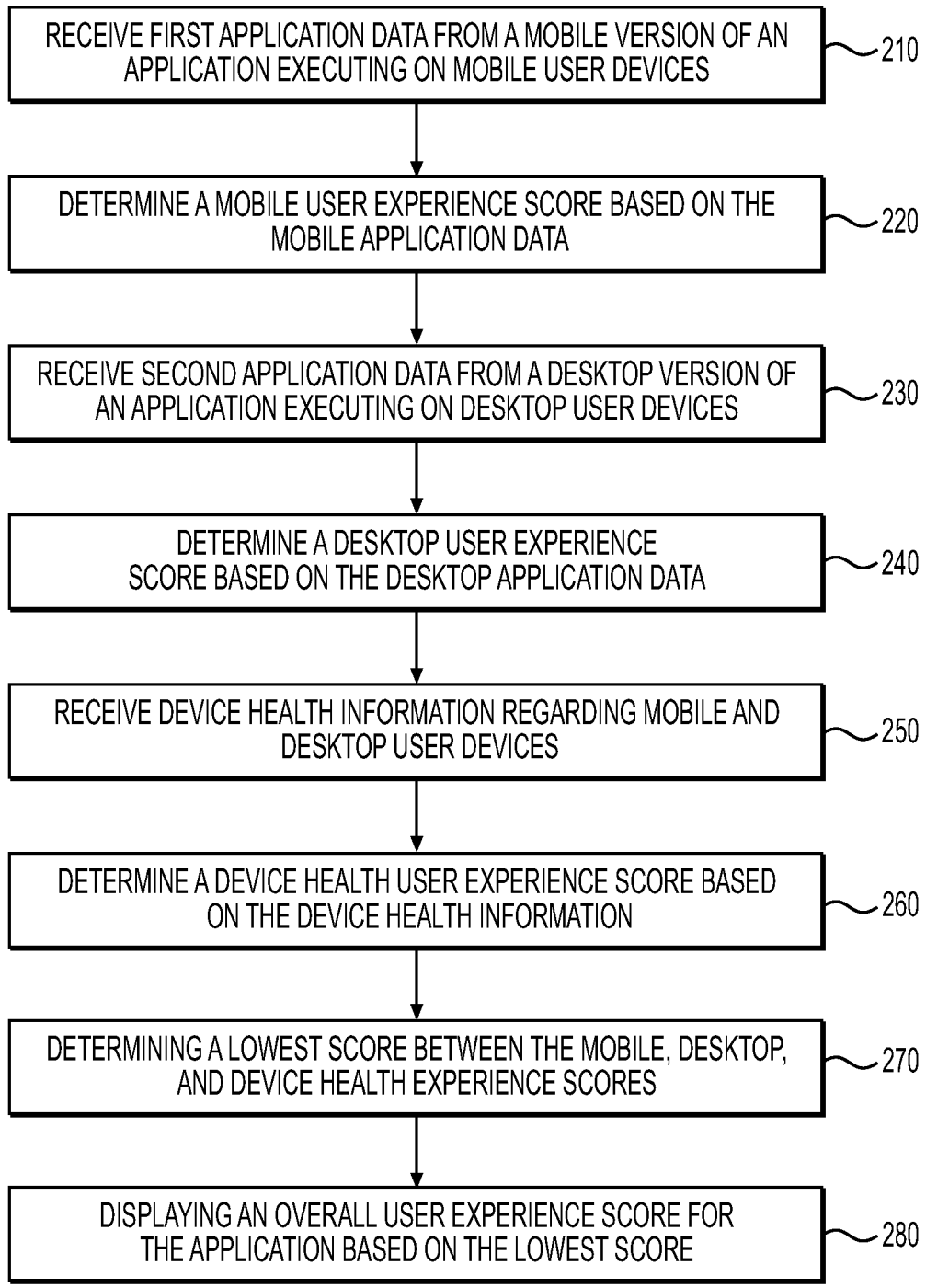
FIG. 2 is a flowchart of an example method for scoring a user experience with an application.

FIG. 2 is a flowchart of an example method for scoring user experience with an application. At stage 210, the management server 150 can receive first application data from mobile user devices 110. In an example, the first application data can relate to the mobile version of the application 130a that executes on the mobile user devices 110. In one example, the mobile application 130a can send the first application data to the management server 150. Alternatively, the management application 140 can gather the data from the mobile application 130a and send it to the management server 150. In one example, the management application 140 can install a software development kit ("SDK") for an agent on the mobile user devices 110 that gathers and sends the application data. The SDK, or other code for collecting the first application data, can also be included within the mobile application 130a itself.

In an example, the first application data can include application performance data, which can be data that indicates how the mobile application 130a is performing. For example, the application performance data can include usage rates, crash rates, network error events, network latency, application response time, application loading time, user flow failures, and CPU and memory utilization. In one example, the first application data can also include user feedback, such as answers from user feedback surveys.

In an example, the mobile user devices 110 can send the first application data as a data file using an Application Program Interface ("API") call or an Internet protocol, such as hypertext transfer protocol ("HTTP"), simple object access protocol ("SOAP"), representational state transfer ("REST"), and/or other protocols.

At stage 220, the management server 150 can determine a mobile user experience score based on the first application data. In an example, the mobile user experience score can be a numerical score. Points can be added or subtracted from the score based on events that occur regarding the mobile application 130a. For example, the management server 150 can add points for positive performance events, such as user usage time and low CPU or memory utilization rates. On the other hand, the management server 150 can remove points for negative events, such as crashes, network errors, network latency, slow application response time, slow application loading time, and user flow failures. Numerical weights can be assigned to events. For example, crash events can cause the mobile user experience score to decrease more than user flow failures. In one example, the mobile user experience score can be calculated using an algorithm provided by an administrator at the admin console 160.

In an example, the management server 150 can determine mobile user experience scores based on users, groups, and entire organizations. For example, the management server 150 can determine a mobile user experience score for each user in an organization that uses the mobile application 130a. In one example, the management server 150 can average the individual mobile user experience scores for each user in a group to determine a mobile user experience score for the group. Likewise, the management server 150 can average the individual mobile user experience scores for all users in an organization to get an organization-wide mobile user experience score for the application 130a. In an alternative example, a group's mobile user experience score can be determined by combining all the first application data for users of the group determining a single score for the group. This same method can be used to combine the first application for all users in an organization to determine an organizational mobile user experience score.

In one example, the management server 150 can apply a minimum usage threshold for mobile user experience scores to be applied. For example, to qualify for a mobile user experience score, the management server 150 can require that the mobile application 130a be in the foreground of a mobile user device 110 for a minimum amount of time. As an example, the management server 150 can require that the application 130a have been foregrounded in its user device 110 at least 15 minutes per day for two consecutive days. The management server 150 can ignore the first application data from any mobile user device 110 that does not meet the usage threshold.

At stage 230, the management server 150 can receive second application data from a desktop version of the application 130 executing on desktop user devices 120. In an example, the second application data can relate to the desktop application 130b that executes on the desktop user devices 120. In one example, the desktop application 130b can send the second application data to the management server 150. Alternatively, the management application 140 can gather the data from the desktop application 130b and send it to the management server 150. In one example, the management application 140 can install an SDK for an agent on the desktop user devices 120 that gathers and sends the second application data. The SDK, or other code for collecting the first application data, can also be included within the desktop application 130b itself.

In an example, like the first application data discussed above, the second application data can also include application performance data, except the second application data can include data that indicates how the desktop version of the application 130 is performing. In one example, the second application data can also include user feedback, such as answers from user feedback surveys.

In an example, the desktop user devices 120 can send the second application data as a data file using an API call or an Internet protocol, such as HTTP, simple object access protocol SOAP, REST, and/or other protocols.

At stage 240, the management server 150 can determine a desktop user experience score based on the second application data. In an example, like the mobile user experience score discussed above, the desktop user experience score can also be a numerical score. Points can be added or subtracted from the score based on events that occur regarding the desktop application 130b. In an example, numerical weights can be assigned to events. For example, crash events can cause the desktop user experience score to decrease more than user flow failures. In one example, the desktop user experience score can be calculated using an algorithm provided by an administrator at the admin console 160.

In an example, the management server 150 can determine multiple desktop user experience scores based on users, groups, and entire organizations. For example, the management server 150 can determine a desktop user experience score for each user in an organization that uses the desktop application 130b. In one example, the management server 150 can average the individual desktop user experience scores for each user in a group to determine a desktop user experience score for the group. Likewise, the management server 150 can average the individual desktop user experience scores for all users in an organization to get an organization-wide desktop user experience score for the desktop application 130b. In an alternative example, a group's desktop user experience score can be determined by combining all the second application data for users of the group to determine a single score for the group. This same method can be used to combine the second application for all users in an organization to determine an organizational desktop user experience score.

In one example, the management server 150 can also apply a minimum usage threshold for desktop user experience scores to be applied. For example, to qualify for a desktop user experience score, the management server 150 can require that the desktop application 130b be in the foreground of a desktop user device 120 for a minimum amount of time. As an example, the management server 150 can require that the desktop application 130b have been foregrounded in its user device 120 at least 15 minutes per day for two consecutive days. The management server 150 can ignore the second application data from any desktop user device 120 that does not meet the usage threshold.

At stage 250, the management server 150 can receive device health information regarding mobile and desktop user devices 110, 120 executing the application 130. In an example, the user devices 110, 120 can send their respective device health information with the first and second application data. The device health information can include information that indicates how the health of the user device may affect a user's experience. Some examples of device health information can include battery health, operating system crashes, boot time, shutdown time, and available storage. The management application 140 can send this information to the management server 150. In an alternate example, the application 130 can send the application data to the management server 150. In an example, the user devices 110, 120 can send the application data and device health information as one or more a data files using an API call or an Internet protocol, such as HTTP, SOAP, REST, and/or other protocols.

In one example, the device health information can be separated into categories, such as device health, device performance, and productivity issues. Device health can include factors like battery drain rate, battery health, hard drive health, and available storage. Device performance can include factors like operating system crash rate, startup and login time, and CPU and memory utilization rates. Productivity issues can include factors like failed passcode entries by the user, Enterprise Access Software ("EAS"), Virtual Private Network ("VPN"), and WIFI configuration and access, and failed registration or syncing between the management application 140 and the management server 150.

In an example, the mobile and desktop user devices 110, 120 can send the device health information as a data file using an API call or an Internet protocol, such as HTTP, simple object access protocol SOAP, REST, and/or other protocols.

At stage 260, the management server 150 can determine a device health user experience score based on the device health information. In an example, like the mobile and desktop user experience scores discussed above, the device health user experience score can also be a numerical score. Points can be added or subtracted from the score based on events that occur regarding the device health. In an example, numerical weights can be assigned to events. In one example, the desktop user experience score can be calculated using an algorithm provided by an administrator at the admin console 160.

In an example, the management server 150 can determine multiple device health user experience scores based on users, groups, and entire organizations. For example, the management server 150 can determine a device health user experience score for each user, or user device, in an organization that uses the application 130. In one example, the management server 150 can average the individual device health user experience scores for each user device 110, 120 in a group to determine a device health user experience score for the group. Likewise, the management server 150 can average the individual device health user experience scores for all users in an organization to get an organization-wide device health user experience score for the application 130. In an alternative example, a group's device health user experience score can be determined by combining all the device health information for users of the group to determine a single score for the group. This same method can be used to combine the device health information for all users in an organization to determine an organizational device health user experience score.

At stage 270, the management server 150 can determine a lowest score between the mobile, desktop, and device health user experience scores. For example, after determining the mobile, desktop, and device health user experience scores, the management server 150 can select the lowest of the three as an overall user experience score. In one example, the three scores can be based on each of the three sets of data aggregated across all users. In another example, the management server 150 can determine a mobile, desktop, and device health user experience score for each user in a group or organization. The management server 150 can average the user scores in their respective categories, and the overall user experience score can be the score with the lowest average score.

In an example, the overall user experience score can be categorical, such as one of "Poor," "Neutral," and "Good." For example, the management server 150 can compare the lowest of the three user experience scores to categorical thresholds, and the overall user experience score can be the category that the lowest score falls into. In one example, the management server 150 can determine the category of each of the mobile, desktop, and device health user experience scores, and the overall user experience score can be the lowest category of the three.

In another example, rather than simply selecting the lowest score between the mobile, desktop, and device health user experience scores, these scores can be combined using a weighted average. For example, an admin can input weights through the admin console 160 indicating that the mobile user experience score should be weighted twice as much as the desktop user experience score but equally to the device health user experience score. The system can then average the three scores together by applying the appropriate weights. Although this disclosure discusses using the lowest of the three scores, the description is also intended to cover a weighted average approach.

At stage 280, the management server 150 can display an overall user experience score for the application 130 based on the lowest of the three scores. In an example, the overall user experience score can be displayed in a scoring GUI. In another example, the management server 150 server can display additional information, just as the percentage of users whose user experience scores fall into each category. The management server 150 can also display more information on the breakdown of the scores, including details on the metrics used to calculate the scores. The displaying of the overall user experience score is described in greater detail regarding FIGS. 6-8 later herein.

In one example of the method described above, the management server 150 can determine an overall user experience score that incorporates the user experience scores of multiple applications available to users. For example, a UEM can make multiple applications available to enrolled user devices. The management server 150 can collect application data for some or all of these applications, as well as the device health information of user devices enrolled in the UEM. The management server 150 can determine a mobile and desktop user experience score for each of these applications. This can allow the UEM to track which applications have poor mobile and desktop user experience scores and how many applications have poor user experience scores due to poor device health. The management application 150 can also determine an overall user experience score for the entire organization by averaging the user experience scores of the applications.

Figure 3:
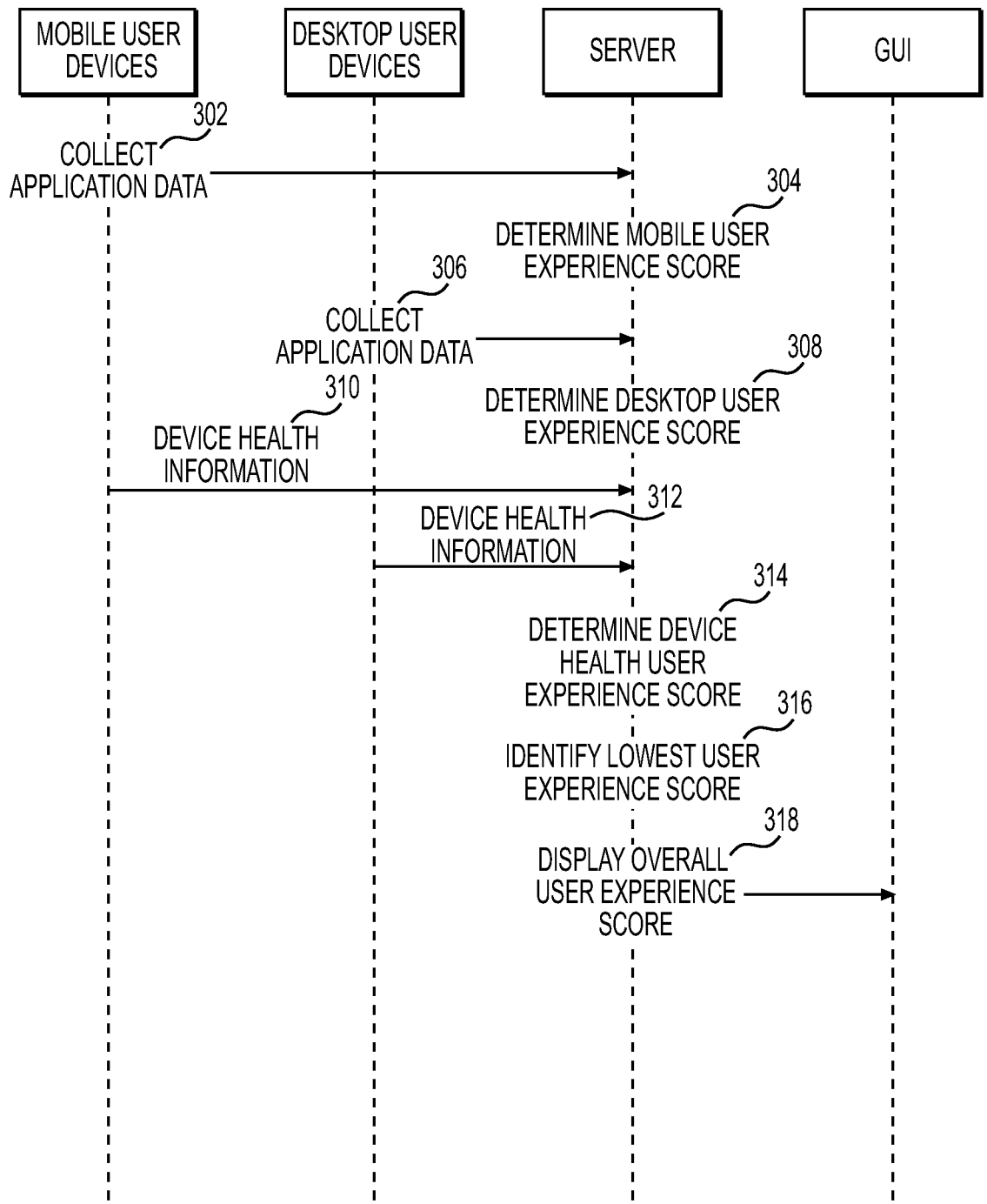
FIG. 3 is a sequence diagram of an example method for scoring a user experience with an application.

FIG. 3 is a sequence diagram of an example method for scoring user experience with an application. At stage 302, mobile user devices 110 can collect application data for the mobile application 130a. The mobile application data can include application performance data, which be data that indicates how the mobile application 130a is performing on the mobile user devices 110. For example, the application performance data can include usage rates, crash rates, network error events, network latency, application response time, application loading time, user flow failures, and CPU and memory utilization. In one example, the first application data can also include user feedback, such as answers from user feedback surveys.

In one example, the mobile application data can be collected and sent by the mobile application 130a installed on the mobile user devices 110. Alternatively, the management application 140 can collect and send the data to the management service 152. In an example, the mobile user devices 110 can send the mobile application data as a data file using an API call or an Internet protocol, such as HTTP, simple object access protocol SOAP, REST, and/or other protocols.

At stage 304, the management server 150 can determine a mobile user experience score based on the mobile application data. In an example, the mobile user experience score can be a numerical score. Points can be added or subtracted from the score based on events that occur regarding the mobile application 130a. For example, the management server 150 can add points for positive performance events, such as user usage time and low CPU or memory utilization rates. On the other hand, the management server 150 can remove points for negative events, such as crashes, network errors, network latency, slow application response time, slow application loading time, and user flow failures.

In one example, the management server 150 can determine a mobile user experience score for each user of the mobile application 130a. The management server 150 can average the scores of the individual users to determine an overall mobile user experience score. In another example, the management server 150 can average the scores of users in groups within an organization to determine a mobile user experience score for those groups. In one example, the management server 150 can compare the mobile user experience score to categorical thresholds. For example, point ranges can be assigned for poor, neutral, and good categories, and the mobile user experience score can be the category that the numerical score falls into. As an example, a poor score can be anything less than 5, a neutral score can be between 5 and 10, and a good score can be anything greater than 10. In one example, the scoring ranges for each category can be set, or changed, by an administrator at the admin console 160.

In an example, the management server 150 can calculate a score for each of a plurality of metrics used to determine the mobile user score experience, such as the application crash rate and hang time, among others. Each metric can have threshold parameters for good, neutral, and bad. In one example, the mobile user experience score can be the lowest category that any of the metrics fall into. For example, if all metrics are "good," except the application crash rate falls under "poor," then the management server 150 can give the mobile user experience score a "poor" rating.

In one example, the management server 150 can apply a minimum usage threshold for mobile user experience scores to be applied. For example, to qualify for a mobile user experience score, the management server 150 can require that the mobile application 130a be in the foreground of a mobile user device 110 for a minimum amount of time.

At stage 306, desktop user devices 120 can collect application data for the desktop application 130b. The desktop application data can include application performance data for the desktop version of application 130. For example, the application performance data can include usage rates, crash rates, network error events, network latency, application response time, application loading time, user flow failures, and CPU and memory utilization. In one example, the desktop application data can also include user feedback, such as answers from user feedback surveys.

In one example, the desktop application data can be collected and sent by the desktop application 130b installed on the desktop user devices 120. Alternatively, the management application 140 on the desktop user devices 120 can collect and send the data to the management service 152. In an example, the desktop user devices 120 can send the desktop application data as a data file using an API call or an Internet protocol, such as HTTP, simple object access protocol SOAP, REST, and/or other protocols.

At stage 308, the management server 150 can determine a desktop user experience score based on the desktop application data. In an example, the desktop user experience score can be a numerical score. Points can be added or subtracted from the score based on events that occur regarding the desktop application 130b. For example, the management server 150 can add points for positive performance events, such as user usage time and low CPU or memory utilization rates. On the other hand, the management server 150 can remove points for negative events, such as crashes, network errors, network latency, slow application response time, slow application loading time, and user flow failures.

In one example, the management server 150 can determine a desktop user experience score for each user of the desktop application 130b. The management server 150 can average the scores of the individual users to determine an overall desktop user experience score. In another example, the management server 150 can average the scores of users in groups within an organization to determine a desktop user experience score for those groups. In one example, the management server 150 can compare the desktop user experience score to categorical thresholds. For example, point ranges can be assigned for poor, neutral, and good categories, and the mobile user experience score can be the category that the numerical score falls into. As an example, a poor score can be anything less than 5, a neutral score can be between 5 and 10, and a good score can be anything greater than 10. In one example, the scoring ranges for each category can be set, or changed, by an administrator at the admin console 160.

In an example, the management server 150 can calculate a score for each of a plurality of metrics used to determine the desktop user score experience, such as the application crash rate and hang time, among others. Each metric can have threshold parameters for good, neutral, and bad. In one example, the mobile user experience score can be the lowest category that any of the metrics fall into. For example, if all metrics are "good," except the application hang time falls under "poor," then the management server 150 can give the desktop user experience score a "poor" rating.

In one example, the management server 150 can apply a minimum usage threshold for desktop user experience scores to be applied. For example, to qualify for a desktop user experience score, the management server 150 can require that the desktop application 130b be in the foreground of a desktop user device 120 for a minimum amount of time.

At stage 310, the mobile user devices 110 can send device health information to the server 150, and at stage 312 the desktop user devices 120 can send device health information to the server 150. The device health information can include various information that indicates how the health of the user device may affect a user's experience. Some examples of device health information can include battery health, operating system crashes, boot time, shutdown time, and available storage.

In one example, the device health information can be separated into categories, such as device health, device performance, and productivity issues. Device health can include factors like battery drain rate, battery health, hard drive health, and available storage. Device performance can include factors like operating system crash rate, startup and login time, and CPU and memory utilization rates. Productivity issues can include factors like failed passcode entries by the user, EAS, VPN, and WIFI configuration and access, and failed registration or syncing between the management application 140 and the management server 150.

In an example, the mobile and desktop user devices 110, 120 can send the device health information as a data file using an API call or an Internet protocol, such as HTTP, simple object access protocol SOAP, REST, and/or other protocols.

At stage 314, the management server 150 can determine a device health user experience score based on the device health information received from the mobile user devices 110 and desktop user devices 120. In an example, the device health user experience score can be a numerical score. Points can be added or subtracted from the score based on events that occur at the user devices 110, 120. In one example, the management server 150 can add points for every negative event that occurs, such as the operating system crashing, a high battery drain rate, or network errors. Each type of negative event can have an associated numerical weight according to the severity of the event. In one example, the management server 150 can compare the calculated score to thresholds for categories. Where positive points reflect negative events as described above, lower scores can receive a "good" score and higher scores can receive a "neutral" or "poor" score.

In an example, the management server 150 can calculate a score for each of a plurality of metrics used to determine the device health user score experience, such as operating system crashes or the battery drain rate, among others. Each metric can have threshold parameters for good, neutral, and bad. In one example, the mobile user experience score can be the lowest category that any of the metrics fall into. For example, if all metrics are "good," except the battery drain rate falls under "poor," then the management server 150 can give the device health user experience score a "poor" rating.

In one example, the management server 150 can apply a minimum usage threshold for device health user experience scores to be applied. For example, to qualify for a device health user experience score, the management server 150 can require that the application 130 be in the foreground of the user device 110, 120 for a minimum amount of time.

At stage 316, the management server 150 can identify the lowest user experience score of the mobile, desktop, and device health user experience scores. In one example, the three scores can be based on each of the three sets of data aggregated across all users. In another example, the management server 150 can determine a mobile, desktop, and device health user experience score for each user in a group or organization. The management server 150 can then average the user scores in their respective categories, and the overall user experience score can be the score with the lowest average score. As an example, the average mobile user experience score can fall into the "good" category range, the average desktop user experience score can fall into the "poor" category range, and the device health user experience score can fall into the "neutral" category range. In this example, the overall user experience score would be "poor" because "poor" is the lowest of the user experience scores.

At stage 318, can display an overall application health score on the scoring GUI. The scoring GUI can be accessible by users, or certain groups of users, within an organization. For example, the scoring GUI can be an interface accessible by administrators so that they can view the health of the application 130 for users within the organization. Example scoring GUIs are described in greater detail regarding FIGS. 6-8 later herein.

Figure 4:
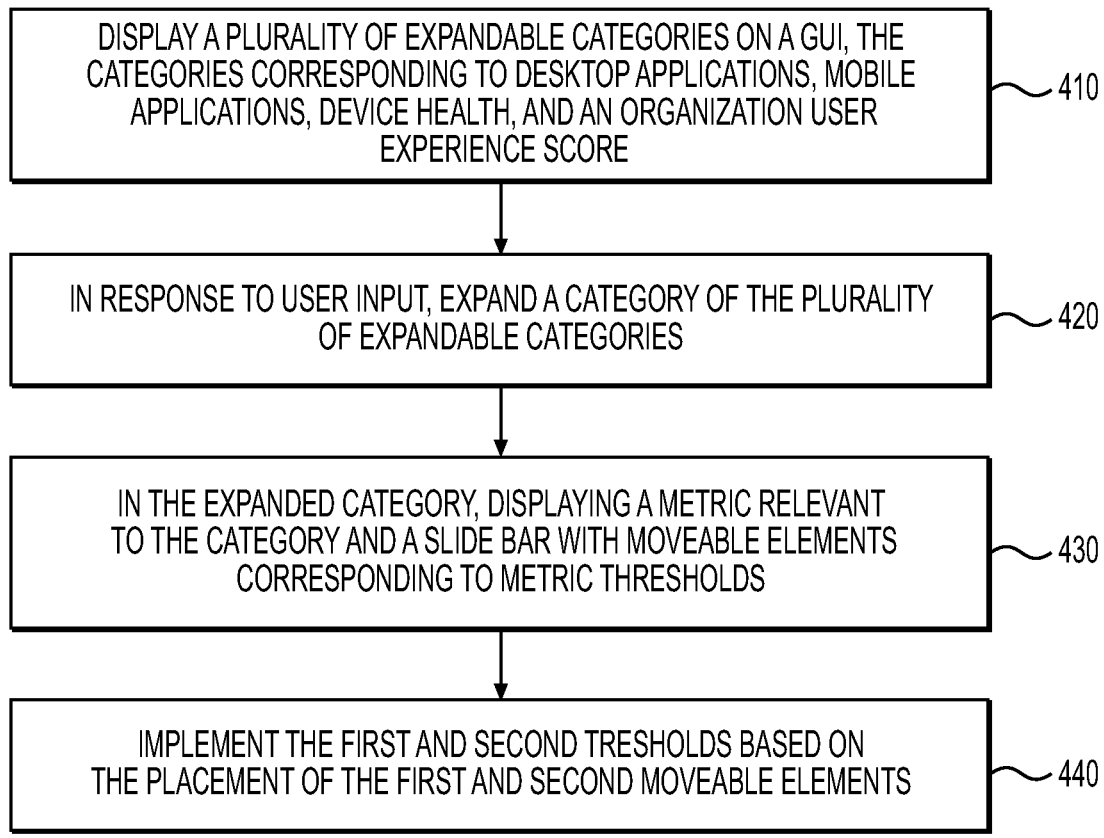
FIG. 4 is a flowchart of an example method for providing a GUI for configuring a user experience score framework.

FIG. 4 is a flowchart of an example method for providing a GUI 162 for configuring a user experience score framework. At stage 410, the GUI 162 can display multiple expandable categories with the categories corresponding to the desktop, mobile, device health, and organization user experience scores. In an example, these scores can correspond to the user experience scores described above regarding FIGS. 2-3.

The expandable categories can be GUI elements that, when selected by a user, expand to provide additional information and interactive features. As an example, if a user selects the desktop category, the element can expand and display information about the parameters for metrics used to calculate the desktop user experience score. For example, the GUI 162 can display information about the parameters for crash rates, hang times, average latency times, and other metrics.

At stage 420, the GUI 162 can expand one of the categories in response to a user selection. For example, the user can click or select a category in the GUI 162. The selection can cause the GUI 162 to expand the selected category to present information about the scoring metrics of that corresponding category. In an example, the non-selected categories can remain collapsed. In one example, a subsequent selection of another category can cause the GUI 162 to expand that category and show the two categories in their expanded views. Alternatively, selecting a second category can cause the GUI 162 to collapse the first selected category.

At stage 430, the GUI 162 can display, in the expanded category, a metric relevant to the category and a slide bar with movable elements corresponding to thresholds of the metric. In one example, the expanded view can display multiple, or all, of the metrics relevant to the category with corresponding slide bar. The movable elements on the slide bar can allow a user to adjust the thresholds for the scoring categories of the metric. For example, a slider can include three regions corresponding to "good," "neutral," and "poor" scores. The movable elements can be located at the threshold between the regions. In one example, the movable elements can display value of the threshold. A user can select and move the movable elements along the sliders to adjust the threshold values.

In an example, each scoring regions on the slide bar can be colored. For example, the portion of the slide bar corresponding to "good" can be green, "neutral" can be yellow," and "bad" can be red. The colors can change at the threshold points where the movable elements are located. As a user adjusts one of the movable elements on the slide bar, the color regions can dynamically change accordingly. For example, as a user moves the movable element corresponding to the good/neutral threshold, the green and yellow regions can change as the movable element is moved. In one example, the color regions can remain fixed until the user finishes moving one of the movable elements. For example, the user can click and drag a movable element. While the drag is occurring, the color regions can remain as there were before the drag began. Once the user releases the movable element, thus ending the drag, the color regions can adjust to align with the new threshold.

At stage 440, the GUI 162 can implement the first and second thresholds based on the placement of the first and second movable elements. For example, the GUI 162 can send, to the GUI engine 154, user input data corresponding to the user changing threshold values with the movable elements. The management server 150 can retrieve the threshold changes and modify the user experience scores accordingly. In an example, this can cause the management server 150 to modify a scoring GUI that displays the results of the user experience scores.

Figure 5:
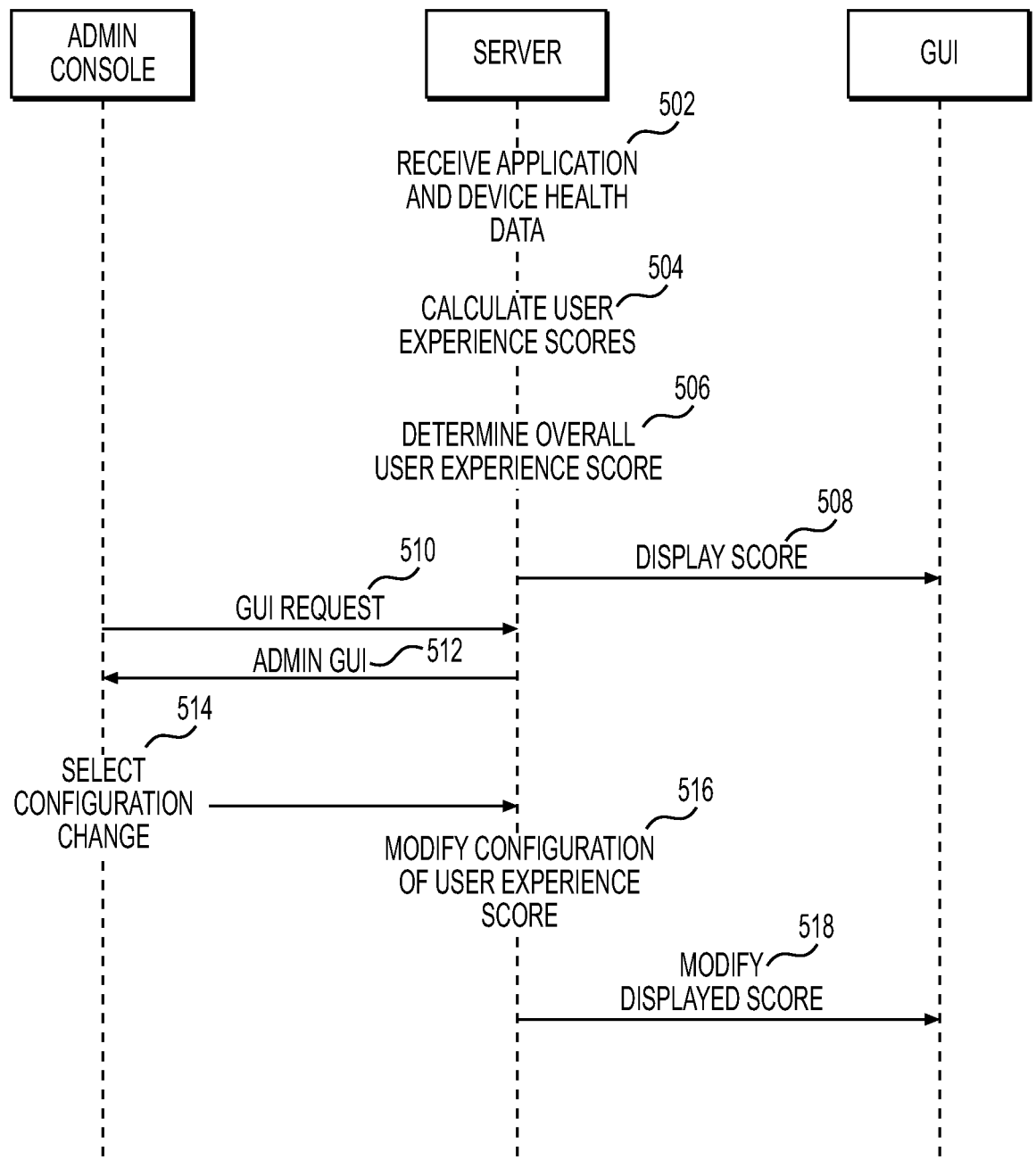
FIG. 5 is a sequence diagram of an example method for providing a GUI for configuring a user experience score framework.

FIG. 5 is a sequence diagram of an example method for providing a GUI for configuring a user experience score framework. At stage 502, the management server 150 can receive application and device health data. In an example, the management server 150 can receive mobile application data from the user devices 110 that include the mobile application data 130a, receive desktop application data from user devices 120 that include the desktop application 130b, and receive device health data from the mobile and desktop user devices 110, 120. The application data can indicate how the application is performing on their corresponding device types. The device health information can include information that indicates how the health of the user devices may be affecting a user's experience.

At stage 504, the management server 150 can calculate mobile, desktop, and device health user experience scores based on the received data. For example, the management server 150 can determine mobile and desktop user experience scores using their corresponding application data. The device health user experience score can be calculated using the device health information. In one example, the management server 150 can calculate a user experience score of each type for each user of the application 130. The user scores for each score type can be averaged to determine the overall score for each of the mobile, desktop, and device health experience scores. In one example, the management server 150 can compare each of the three scores to thresholds of scoring categories to determine the score's rating. For example, the scores can fall into "good," "neutral," or "poor" according to the threshold values.

At stage 506, the management server 150 can determine an overall user experience score based on the mobile, desktop, and device health user experience scores. In an example, this can be done by determining the lowest of the three user experience scores. In another example, the management server 150 can determine the lowest score rating that any of the three score types falls into, and that lowest rating can be the overall user experience score. For example, where the mobile and desktop user experiences scores are "good," but the device health user experience score is "neutral," the overall user experience score can be "neutral."

At stage 508, the management server 150 can display the overall user experience score on a scoring GUI. In an example, the scoring GUI can be a dashboard interface that displays user experience scores. In one example, the scoring GUI can also display the mobile, desktop, and device health user experience scores. The scoring GUI can display additional information relating to the scores, such as the metrics, percentage of devices within each scoring category, and more. The scoring GUI dashboard is described in greater detail regarding FIGS. 6-8 later herein.

At stage 510, the admin console 160 can request the admin GUI 162 from the management server 150. The GUI 162 can be a user interface that allows a user, such as an administrator, to manage user experience score metrics and the scoring GUI. In an example, the request can be made as an HTTP request or an API call. In one example, the request can be made by a browser on the admin console 160. For example, the GUI 162 can be web-based, and an admin user can navigate to a Uniform Resource Locator ("URL") associated with the GUI 162.

At stage 512, the management server 150 can provide the admin GUI 162 to the admin console 160. In an example, the GUI engine 154 can provide a data file, such as a JSON or XML file, for the GUI 162, which can be sent to the admin console by the management server 150. The data file can be sent using an API call or an Internet protocol, such as HTTP, simple object access protocol SOAP, REST, and/or other protocols. The GUI 162 can then be displayed on the admin console. In another example, the admin GUI 162 is displayed at the admin console 160 through a web portal or browser that displays information provided by the server 150.

The GUI 162 can include multiple expandable categories that correspond to the desktop, mobile, device health, and organization user experience scores. The expandable categories can be GUI elements that, when selected by a user, expand to provide additional information and interactive features. As an example, if a user selects the desktop category, the category can expand and display information about the metrics used to calculate the desktop user experience score. For example, the GUI 162 can display information about the parameters for crash rates, hang times, average latency times, and other metrics.

At stage 514, the admin console 160 can receive a selection for changing the configuration of a user experience score. For example, the metrics displayed in the expanded view of a category can include slide bars with movable elements for adjusting threshold values used to determine the scores. For example, a slider can include three regions corresponding to "good," "neutral," and "bad" scores. The movable elements can be located at the threshold between the regions. In one example, the movable elements can display value of the threshold. A user can reconfigure the threshold values of a metric's score by moving the threshold elements on the metric's slide bar.

At stage 516, the management server 150 can modify the configuration of the user experience score according to the user selection. For example, upon receiving input from a user adjusting the scoring GUI's configuration in the GUI 162, the admin console can send the updated configuration settings to the management server 150. At stage 518, the management server 150 can then update the scoring GUI according to the configuration setting changes. In one example, this can be handled by the GUI engine 154.

Figure 6:
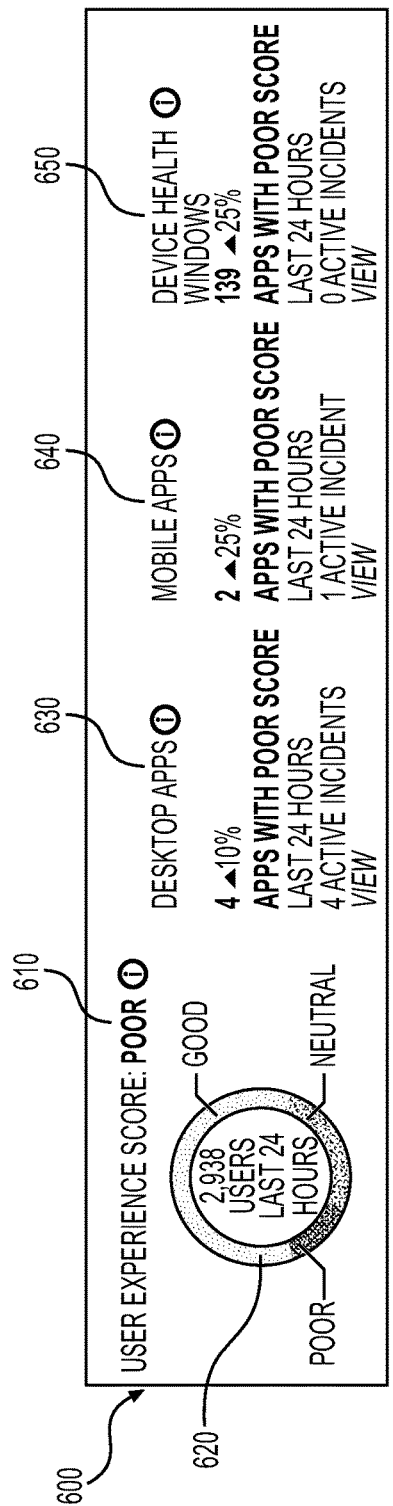
FIG. 6 is an illustration of an example GUI used to provide a user experience score.

FIG. 6 is an illustration of an example scoring GUI 600 used to provide a user experience score. The scoring GUI 600 can display the overall user experience score 610 for the application 130. The scoring GUI 600 depicted in FIG. 6 includes a chart 620 that displays a breakdown of how many users fall into each scoring category. The scoring GUI 600 also includes a desktop score region 630, mobile score region 640, and a device health score region 650. The desktop and mobile score regions 630, 640 can show the number of applications of their respective types that have a poor user experience score. For example, the scoring GUI 600 indicates that four desktop applications have a poor user experience score and two mobile applications have a poor user experience score. The device health score region 650 can show the number of user devices that have a poor device health user experience score. For example, the scoring GUI 600 indicates that 139 user devices have a poor device health user experience score.

Figure 7:
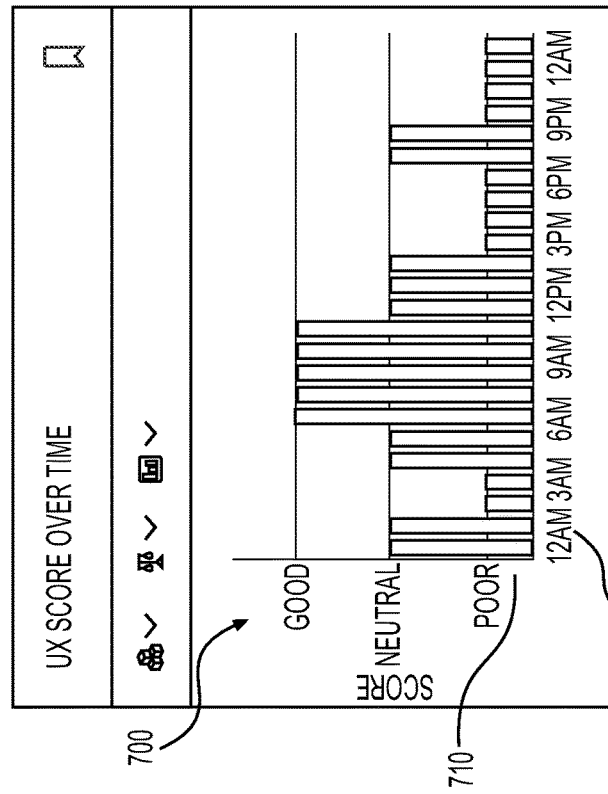
FIG. 7 is an illustration of a second example GUI used to provide a user experience score.

FIG. 7 illustrates an example score graph 700 of user experience scores over time. The y-axis 710 represents user experience scores as "poor," "neutral," or "good," and the x-axis 720 represents the time of day. For example, the score graph 700 in FIG. 7 shows a user experience score over the past 24 hours. In an example, a score graph 700 can be created for any of the user experience scores or their corresponding metrics. For example, the score GUI 600 can include an element that, when selected by a user, displays the score graph 700 for certain data. In one example, a user can apply filters to the score graph 700 to determine which data set to display. Some examples can include a mobile or desktop user experience score for one or more applications, a device health user experience score, and an overall user experience score for one or more applications.

Figure 8:
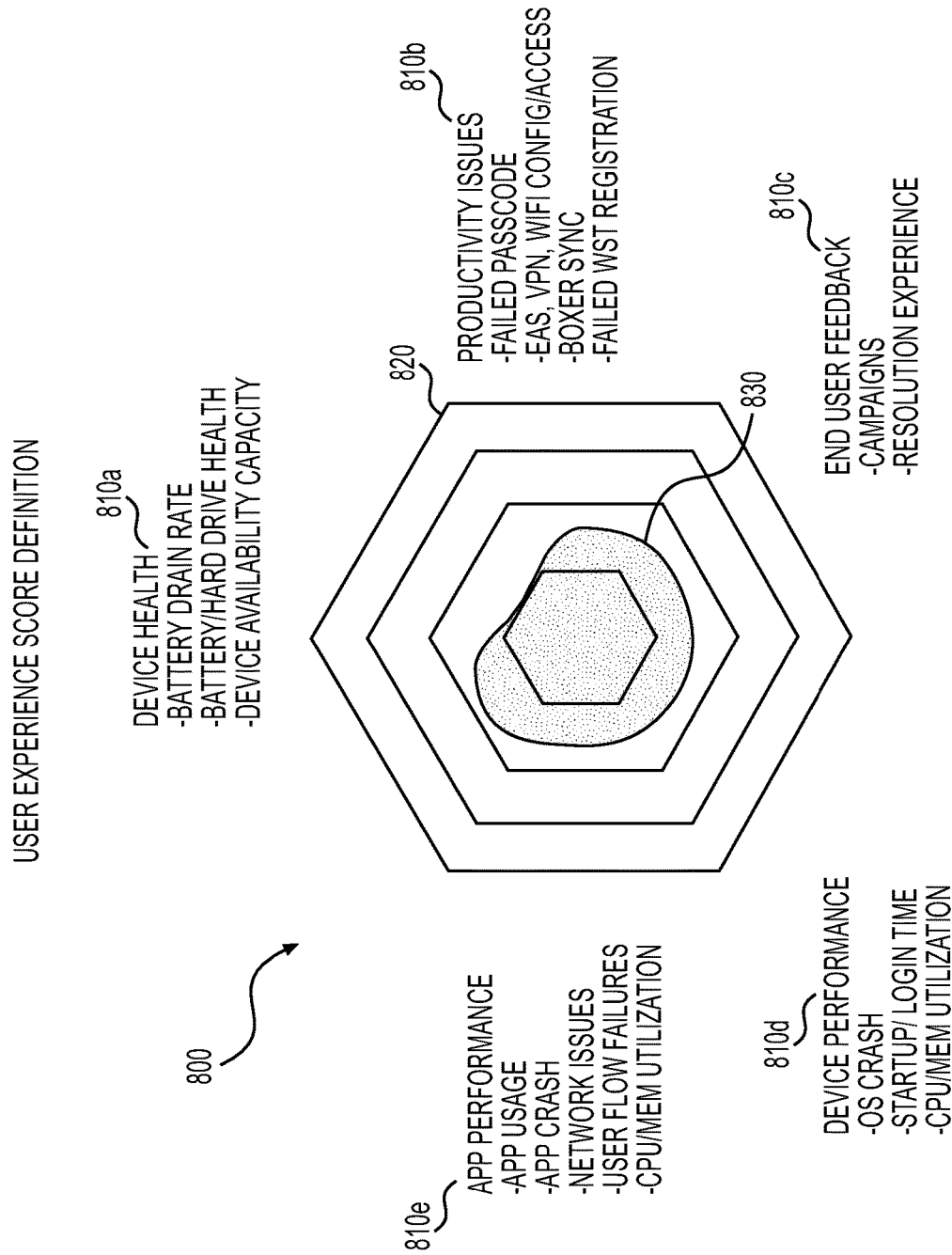
FIG. 8 is an illustration of a third example GUI used to provide a user experience score.

FIG. 8 is an illustration of a third example scoring definition GUI 800 used to provide metric information relating to a user experience score. The scoring definition GUI 800 can be a polygon chart where each point represents a metric used in calculating a user experience score. For example, the scoring definition GUI 800 shown in FIG. 8 is a hexagon that represents six scoring metric categories 810. The scoring metric categories shown are device health 810a, productivity issues 810b, end user feedback 810c, device performance 810d, and application performance 810e. The polygon rings 820 represent the magnitude of each category's score, with the center representing zero. The shaded region 830 represents how the user experience scores are distributed across the six metrics. Although a hexagon polygon chart is shown, the shape can change according to the number of metric categories used. In an example, the scoring definition GUI 800 can allow a user to choose which metric categories 810 to display. The scoring definition GUI 800 can also allow a user to choose the data of which user experience score to display.

Figure 9:
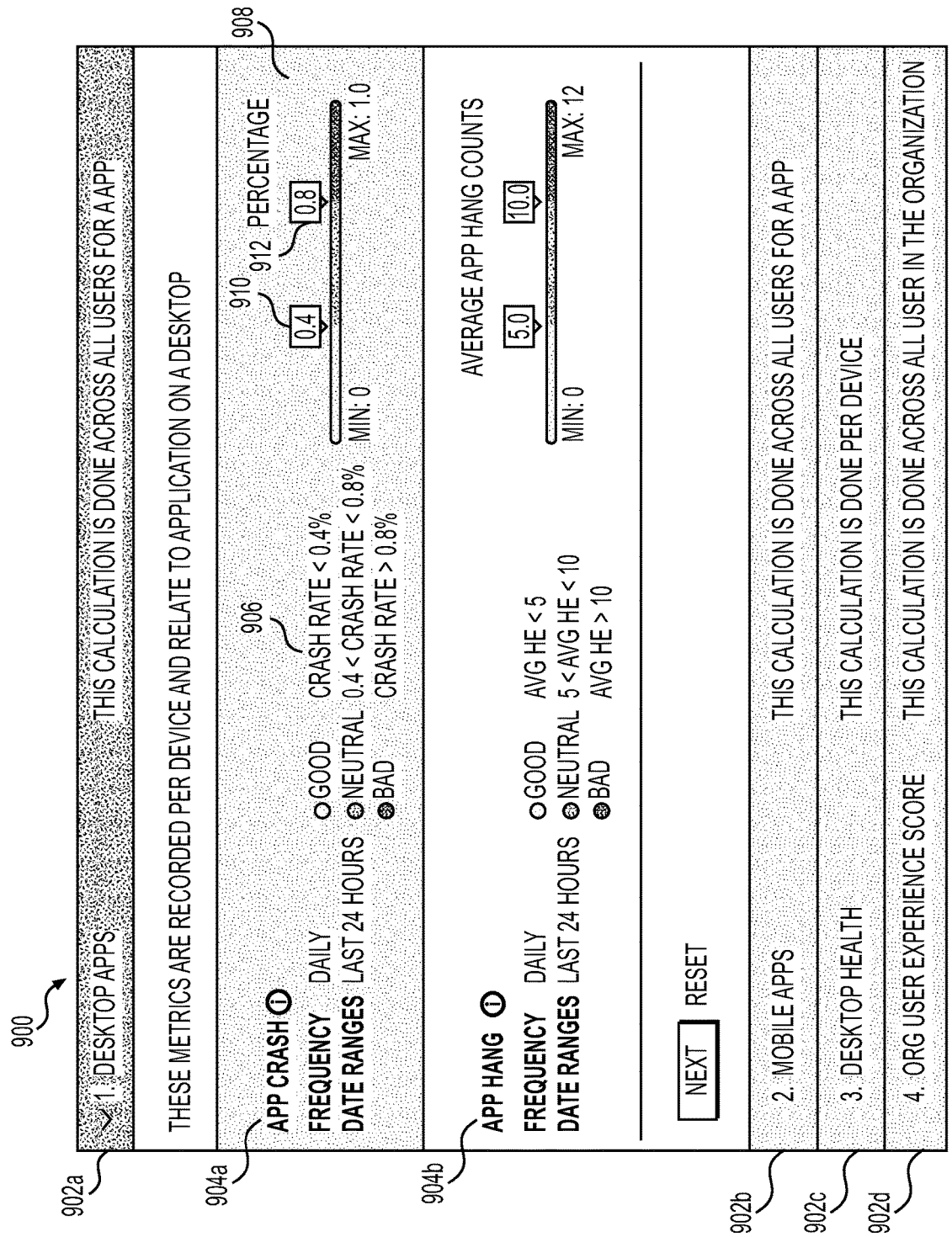
FIG. 9 is an illustration of an example GUI console used to configure a user experience score framework.

FIG. 9 is an illustration of an example GUI 900 used to configure a user experience score framework. The GUI 900 can include expandable experience score categories 902 that, when selected by a user, expand to show more information about a user experience score. The GUI 900 shown in FIG. 9 includes expandable experience score categories 902 for desktop applications 902a, mobile applications 902b, device health 902c, and organizational user experience score 902d. When an expandable experience score category 902 is selected and expanded, it can display metric regions 904 that include information for metrics used to calculate that score. For example, as shown, the desktop category 902a includes a section for application crash rate 904a and application hang times 904b. Each metric region can include a scoring definition summary 906 and an interactive slide bar 908. The score rating summary 906 can display the scoring definitions for each category a score can fall into. For example, the score rating summary 906 for the desktop application crash rate metric 904a shows that the metric receives a "good" rating for less than 0.4%, "neutral" for 0.4%-0.8%, and "poor" for >0.8%.

The interactive sliding bar 908 and include two movable elements 910 and 912. A user can move the movable elements 910, 912 to change the thresholds between score ratings. For example, movable element 910 can change the threshold score between "good" and "neutral," and the movable element 920 can change the threshold score between "neutral" and "poor." In some examples, the movable elements 910, 912 can each include a field for a user to enter a value to be associated with the element.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for providing a user experience score for an application, comprising:

receiving first application data from a mobile version of the application executing on a plurality of mobile user devices, the first application data including user experience information for the mobile version of the application over a period of time;

determining a mobile user experience score for each of the plurality of mobile user devices based on the first application data;

receiving second application data from a desktop version of the application executing on a plurality of desktop user devices, the second application data including user experience information for the desktop version of the application over a period of time, wherein the second application data includes an amount of time that the application has been in the foreground of its corresponding desktop user device;

determining a desktop user experience score for a portion of the plurality of desktop user devices based on the second application data, the portion of the plurality of desktop user devices corresponding to desktop user devices that had the application in the foreground above a minimum usage threshold;

receiving device health information regarding the plurality of mobile user devices and the plurality of desktop user devices;

determining, for each mobile user device in the plurality of mobile user devices and each desktop user device in the portion of the plurality of desktop user devices, a device health user experience score based on the device health information; and determining, for each mobile user device in the plurality of mobile user devices and each desktop user device in the portion of the plurality of desktop user devices, an overall user experience score, the user experience score being the lowest of the mobile user experience score, the desktop user experience score, and the device health score;

assigning each of the overall user experience scores to one of a plurality of categories based on at least one category threshold;

displaying, in a graphical user interface ("GUI"), a percentage of overall user experience scores in each of the plurality of categories, the GUI including, on a slide bar, a movable element for each of the plurality of categories;

receiving, at the GUI, user input moving one movable element on the slide bar; and dynamically adjusting the displaying of the percentage of overall user experience scores in each of the plurality of categories based on the received input.

2. The method of claim 1, wherein the first and second application data includes an indication of at least one of crash rate, average latency time, and error information of the application.

3. The method of claim 1, wherein the first application data includes an amount of time that the application has been in the foreground of its corresponding mobile user device, and wherein the mobile user experience score is determined based on a portion of the first application data, the portion of the first application data corresponding to mobile user devices that had the application in the foreground above the minimum usage threshold.

4. The method of claim 1, wherein the device health information includes an indication of at least one of battery health, operating system crashes, boot time, shutdown time, and available storage, and wherein the device health user experience score is further based on the indication.

5. The method of claim 1, further comprising:
determining an overall user experience score for each of a plurality of applications managed by an organization; and
determining an overall user experience score for the organization based on the overall user experience scores of the plurality of applications.

6. The method of claim 1, wherein the lowest score is determined for each user of the application, and the overall user experience score is based on an average of each user's lowest score.

7. The method of claim 1, further comprising:
displaying, in the GUI, a percentage of mobile experience scores below a first scoring threshold; and
displaying, in the GUI, a percentage of desktop experience scores below a second scoring threshold.

8. A non-transitory, computer-readable medium containing instructions that, when executed by a hardware-based processor, performs stages for providing a user experience score for an application, the stages comprising:
receiving first application data from a mobile version of the application executing on a plurality of mobile user devices, the first application data including user experience information for the mobile version of the application over a period of time;
determining a mobile user experience score for each of the plurality of mobile user devices based on the first application data;
receiving second application data from a desktop version of the application executing on a plurality of desktop user devices, the second application data including user experience information for the desktop version of the application over a period of time, wherein the second application data includes an amount of time that the application has been in the foreground of its corresponding desktop user device;
determining a desktop user experience score for a portion of the plurality of desktop user devices based on the second application data, the portion of the plurality of desktop user devices corresponding to desktop user devices that had the application in the foreground above a minimum usage threshold;
receiving device health information regarding the plurality of mobile user devices and the plurality of desktop user devices;
determining, for each mobile user device in the plurality of mobile user devices and each desktop user device in the portion of the plurality of desktop user devices, a device health user experience score based on the device health information; and
determining, for each mobile user device in the plurality of mobile user devices and each desktop user device in the portion of the plurality of desktop user devices, an overall user experience score, the user experience score being the lowest of the mobile user experience score, the desktop user experience score, and the device health score;
assigning each of the overall user experience scores to one of a plurality of categories based on at least one category threshold;
displaying, in a graphical user interface ("GUI"), a percentage of overall user experience scores in each of the plurality of categories, the GUI including, on a slide bar, a movable element for each of the plurality of categories;
receiving, at the GUI, user input moving one movable element on the slide bar; and
dynamically adjusting the displaying of the percentage of overall user experience scores in each of the plurality of categories based on the received input.

9. The non-transitory, computer-readable medium of claim 8, wherein the first and second application data includes an indication of at least one of crash rate, average latency time, and error information of the application.

10. The non-transitory, computer-readable medium of claim 8, wherein the first application data includes an amount of time that the application has been in the foreground of its corresponding mobile user device, and wherein the mobile user experience score is determined based on a portion of the first application data, the portion of the first application data corresponding to mobile user devices that had the application in the foreground above the minimum usage threshold.

11. The non-transitory, computer-readable medium of claim 8, wherein the device health information includes an indication of at least one of battery health, operating system crashes, boot time, shutdown time, and available storage, and wherein the device health experience score is further based on the indication.

12. The non-transitory, computer-readable medium of claim 8, the stages further comprising:
determining an overall user experience score for each of a plurality of applications managed by an organization; and
determining an overall user experience score for the organization based on the overall user experience scores of the plurality of applications.

13. The non-transitory, computer-readable medium of claim 8, wherein the lowest score is determined for each user of the application, and the overall user experience score is based on an average of each user's lowest score.

14. The non-transitory, computer-readable medium of claim 8, the stages further comprising:
displaying, in the GUI, a percentage of mobile experience scores below a first scoring threshold; and
displaying, in the GUI, a percentage of desktop experience scores below a second scoring threshold.

15. A system for providing a user experience score for an application, comprising:
a memory storage including a non-transitory, computer-readable medium comprising instructions; and
a computing device including a hardware-based processor that executes the instructions to carry out stages comprising:
receiving first application data from a mobile version of the application executing on a plurality of mobile user devices, the first application data including user experience information for the mobile version of the application over a period of time;

determining a mobile user experience score for each of the plurality of mobile user devices based on the first application data;

receiving second application data from a desktop version of the application executing on a plurality of desktop user devices, the second application data including user experience information for the desktop version of the application over a period of time, wherein the second application data includes an amount of time that the application has been in the foreground of its corresponding desktop user device;

determining a desktop user experience score for a portion of the plurality of desktop user devices based on the second application data, the portion of the plurality of desktop user devices corresponding to desktop user devices that had the application in the foreground above a minimum usage threshold;

receiving device health information regarding the plurality of mobile user devices and the plurality of desktop user devices;

determining, for each mobile user device in the plurality of mobile user devices and each desktop user device in the portion of the plurality of desktop user devices, a device health user experience score based on the device health information; and determining, for each mobile user device in the plurality of mobile user devices and each desktop user device in the portion of the plurality of desktop user devices, an overall user experience score, the user experience score being the lowest of the mobile user experience score, the desktop user experience score, and the device health score;

assigning each of the overall user experience scores to one of a plurality of categories based on at least one category threshold;

displaying, in a graphical user interface ("GUI"), a percentage of overall user experience scores in each of the plurality of categories, the GUI including, on a slide bar, a movable element for each of the plurality of categories;

receiving, at the GUI, user input moving one movable element on the slide bar; and dynamically adjusting the displaying of the percentage of overall user experience scores in each of the plurality of categories based on the received input.

16. The system of claim 15, wherein the first and second application data includes an indication of at least one of crash rate, average latency time, and error information of the application.

17. The system of claim 15, wherein the first application data includes an amount of time that the application has been in the foreground of its corresponding mobile user device, and wherein the mobile user experience score is determined based on a portion of the first application data, the portion of the first application data corresponding to mobile user devices that had the application in the foreground above the minimum usage threshold.

18. The system of claim 15, wherein the device health information includes an indication of at least one of battery health, operating system crashes, boot time, shutdown time, and available storage, and wherein the device health experience score is further based on the indication.

19. The system of claim 15, the stages further comprising:

determining an overall user experience score for each of a plurality of applications managed by an organization; and determining an overall user experience score for the organization based on the overall user experience scores of the plurality of applications.

20. The system of claim 15, wherein the lowest score is determined for each user of the application, and the overall user experience score is based on an average of each user's lowest score.

* * * * *